United States Patent
Thai et al.

(10) Patent No.: US 10,610,796 B1
(45) Date of Patent: Apr. 7, 2020

(54) RIDE-ON TOY VEHICLE

(71) Applicant: National Products Limited, TST East, Kowloon (HK)

(72) Inventors: Vincent Thuan Thanh Thai, Kowloon (HK); Yuen Lam Ng, Kowloon (HK)

(73) Assignee: National Products Limited, Hong Kong (HK)

( * ) Notice: Subject to any disclaimer, the term of this patent is extended or adjusted under 35 U.S.C. 154(b) by 0 days.

(21) Appl. No.: 16/158,148

(22) Filed: Oct. 11, 2018

(51) Int. Cl.
*A63H 17/26* (2006.01)
*A63H 33/00* (2006.01)
*B62K 9/00* (2006.01)

(52) U.S. Cl.
CPC ........... *A63H 17/26* (2013.01); *A63H 33/003* (2013.01); *B62K 9/00* (2013.01)

(58) Field of Classification Search
CPC ................................ A63H 17/00; A63H 17/26
USPC .............. 296/177, 37.2, 37.3; 108/44, 50.11; 297/16.1, 18, 119, 129, 175, 217.1, 440.1
See application file for complete search history.

(56) References Cited

U.S. PATENT DOCUMENTS

| | | | | |
|---|---|---|---|---|
| 1,514,220 A | * | 11/1924 | Morgan | A63H 17/00 446/279 |
| 1,942,603 A | * | 1/1934 | Johanson | A47B 3/02 108/119 |
| 2,834,398 A | * | 5/1958 | Thelen | B60N 2/3095 297/147 |
| 3,338,620 A | * | 8/1967 | Cauvin | B60N 3/001 296/37.14 |
| 5,413,488 A | * | 5/1995 | Gibson | G09B 19/00 434/432 |
| 5,950,257 A | | 9/1999 | Smith et al. | |
| 6,446,981 B1 | | 9/2002 | Wise et al. | |
| D504,241 S | | 4/2005 | Hightower | |
| 8,191,907 B2 | | 6/2012 | Watson | |
| 9,221,484 B2 | | 12/2015 | Logvin et al. | |
| 2015/0230599 A1 | * | 8/2015 | Larimer | A47B 3/10 108/13 |
| 2019/0336878 A1 | * | 11/2019 | Talios | A63H 17/38 |

* cited by examiner

Primary Examiner — Dennis H Pedder
(74) Attorney, Agent, or Firm — Raymond Sun (57) ABSTRACT

A ride-on vehicle has a vehicle body, a plurality of wheels, at least one passenger seat, a steering wheel, an accelerator pedal, a rear panel, first and second crossing legs and a spare tire. The rear panel has a table top section and a base support, the table top section having a table top surface and a bottom surface. The rear panel can be positioned in a driving mode position and a stationary mode position, with the table top surface positioned against the passenger seat when in the driving mode position, and the table top surface is positioned horizontally when in the stationary mode position. The crossing legs and the spare tire can be secured against the bottom of the rear panel when the rear panel is in the driving mode position, and the crossing legs and spare tire can be assembled into a portable stool when removed from the rear panel, with the crossing legs intertwined and the spare tire removably secured on top of the crossing legs.

6 Claims, 7 Drawing Sheets

RIDE-ON TOY VEHICLE

BACKGROUND OF THE INVENTION

1. Field of the Invention

The present invention relates to ride-on toy vehicles, and in particular, to a ride-on toy vehicle having a built-in picnic table and portable stool that can be easily and conveniently mounted on to the vehicle as a spare tire.

2. Description of the Prior Art

Ride-on toy vehicles are very popular among children and young adults, and are often used to ride around the yard or neighborhood. Unfortunately, most conventional ride-on toy vehicles only function as a toy vehicle and do not provide any additional play or amusement value.

Therefore, it is desirable to provide a ride-on toy vehicle with built-in amusement or play features to enhance the play or entertainment value of the ride-on toy vehicle.

SUMMARY OF THE INVENTION

It is an object of the present invention to provide a ride-on toy vehicle with built-in amusement or play features to enhance the play or entertainment value of the ride-on toy vehicle rack for holding articles.

It is another object of the present invention to provide a ride-on toy vehicle having a built-in picnic table.

It is yet another object of the present invention to provide a ride-on toy vehicle having a built-in spare tire that can be used as a stool for the picnic table.

The present invention provides a ride-on vehicle having a vehicle body, a plurality of wheels, at least one passenger seat, a steering wheel, an accelerator pedal, a rear panel, first and second crossing legs and a spare tire. The rear panel has a table top section and a base support, the table top section having a table top surface and a bottom surface. The rear panel can be positioned in a driving mode position and a stationary mode position, with the table top surface positioned against the passenger seat when in the driving mode position, and the table top surface is positioned horizontally when in the stationary mode position. The crossing legs and the spare tire can be secured against the bottom of the rear panel when the rear panel is in the driving mode position, and the crossing legs and spare tire can be assembled into a portable stool when removed from the rear panel, with the crossing legs intertwined and the spare tire removably secured on top of the crossing legs.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1-5 illustrate a ride-on vehicle 20 according to one embodiment of the present invention. The vehicle 20 can be any conventional ride-on vehicle having a vehicle body 22, four wheels 24, one or more passenger seats 26, a steering wheel 28, an accelerator pedal 30, and other operational components that allow the vehicle 20 to operate as a ride-on vehicle that can be occupied and controlled by a child.

Figure 1:
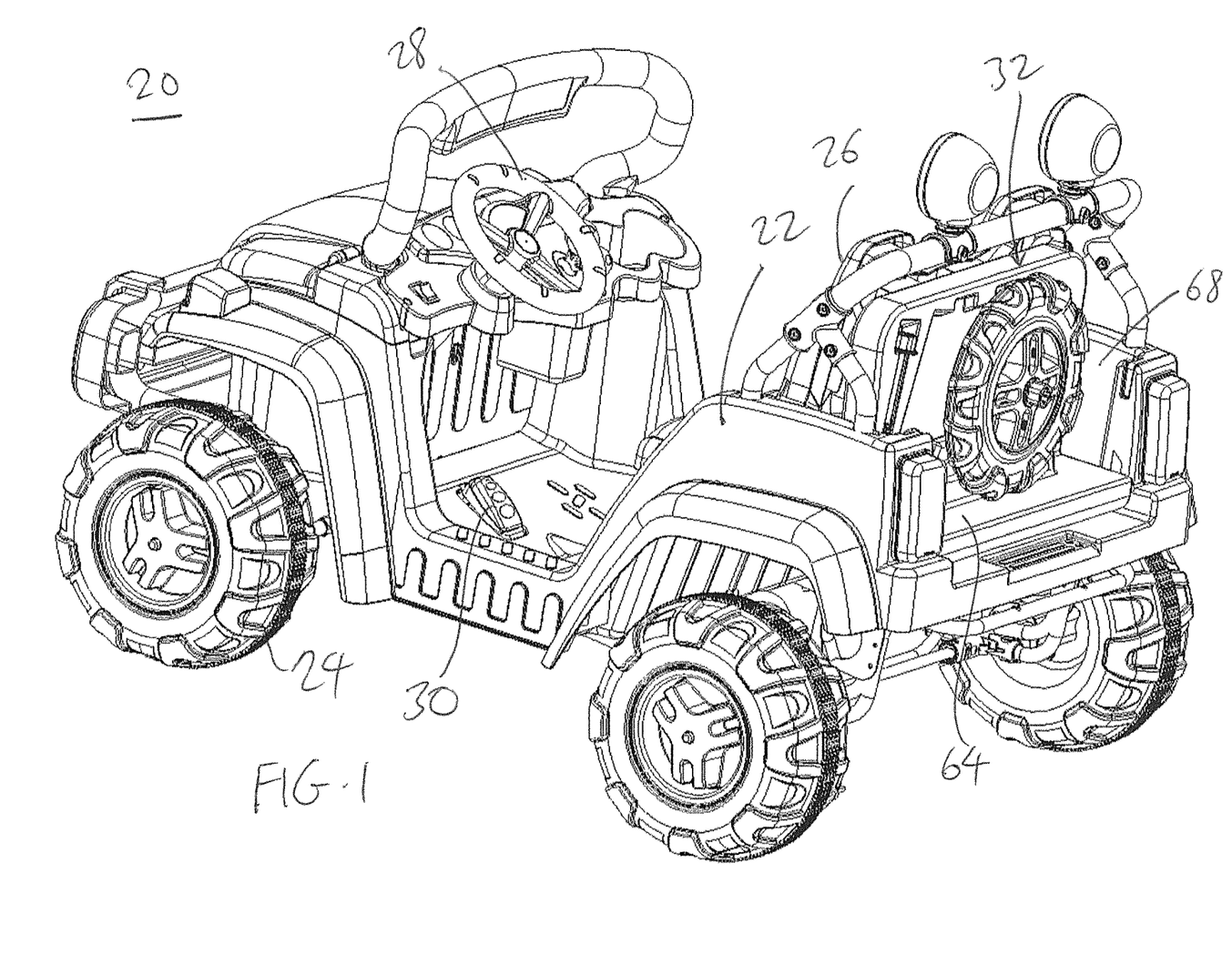
FIG. 1 is a perspective view of a ride-on vehicle according to one embodiment of the present invention shown with the rear panel in a storage position with a spare tire in place.
Figure 2:
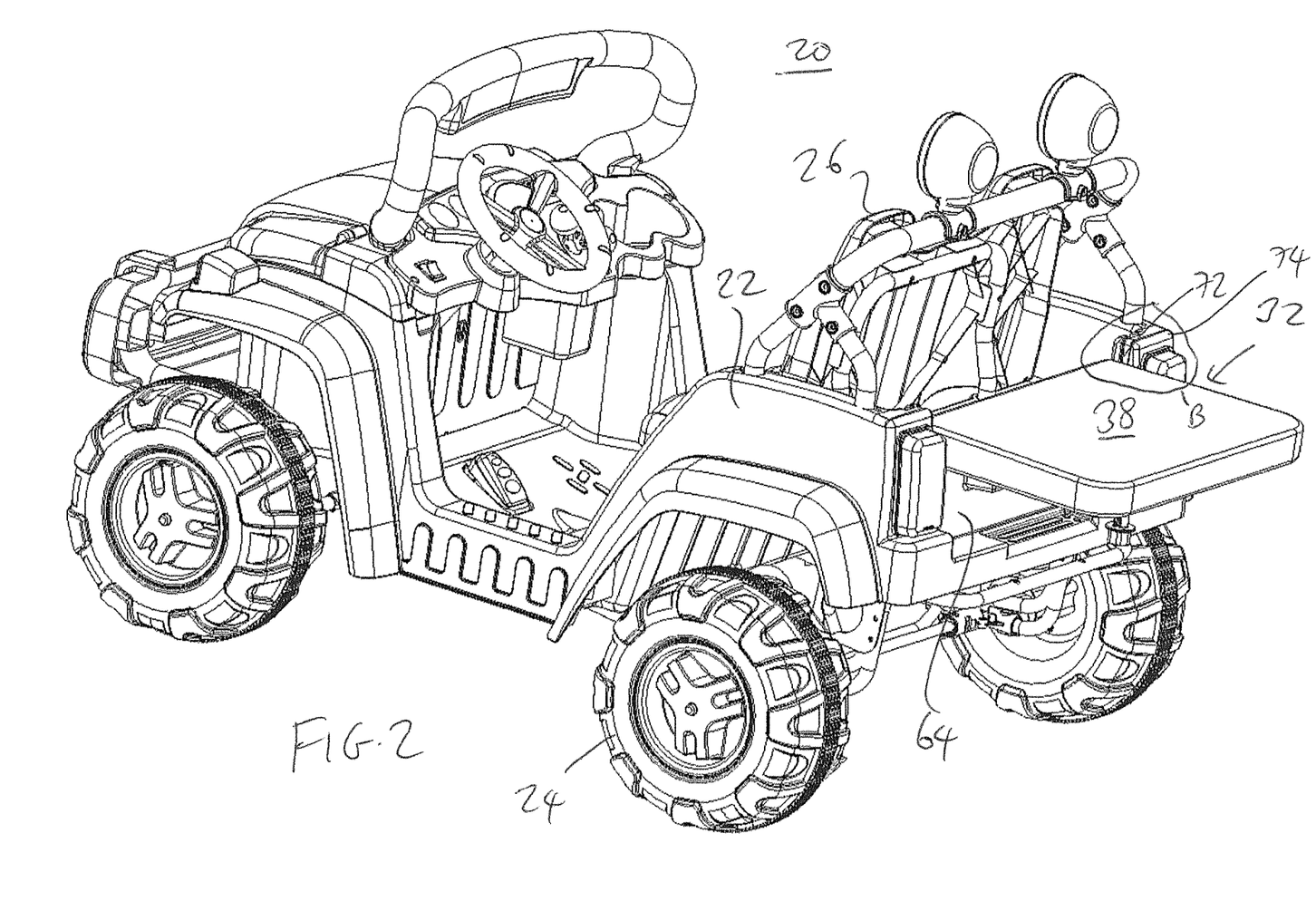
FIG. 2 is a perspective view of the vehicle of FIG. 1 shown with the rear panel deployed as a picnic table.
Figure 3:
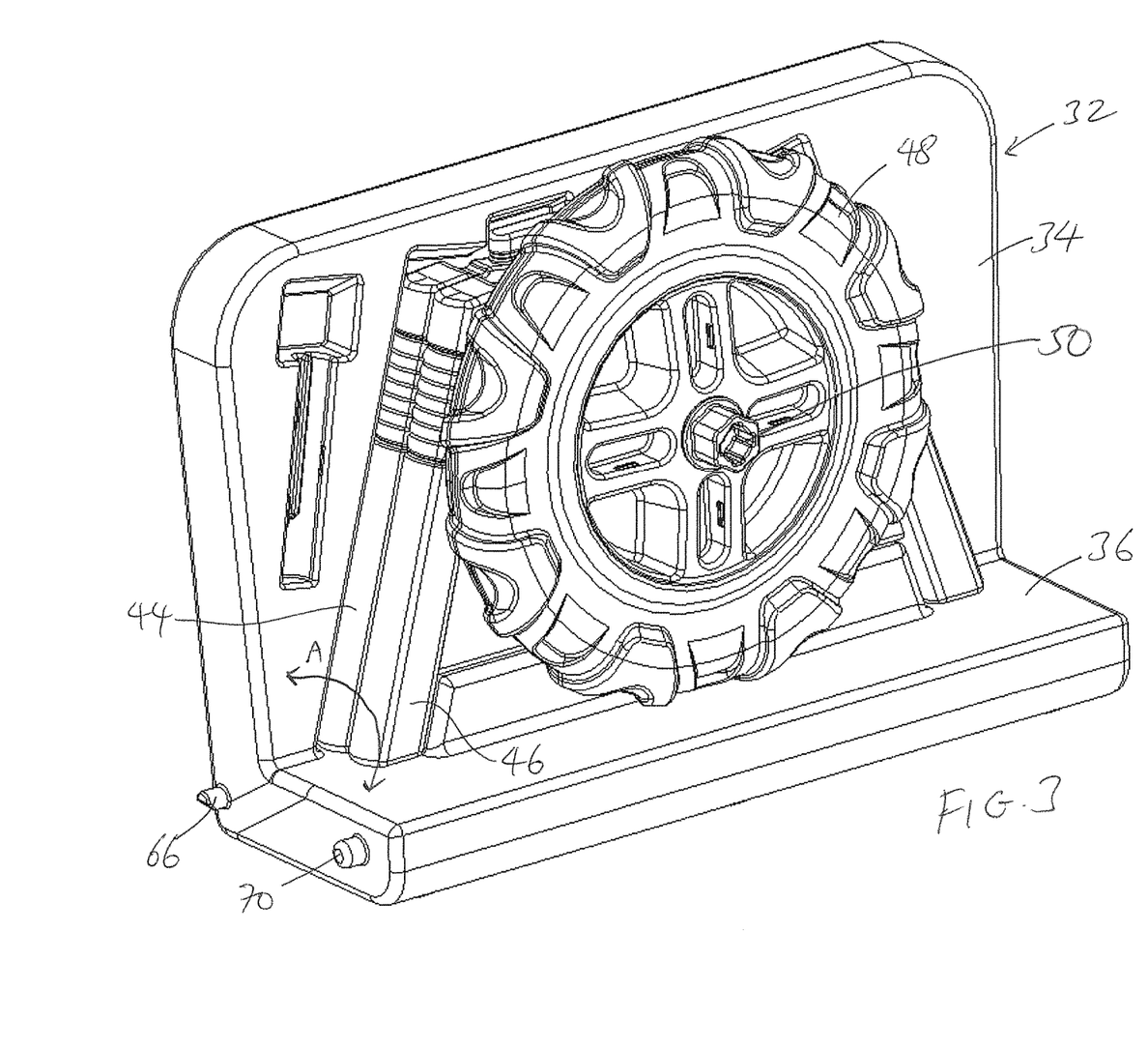
FIG. 3 is an enlarged view of the rear panel and spare tire of FIG. 1.
Figure 4:
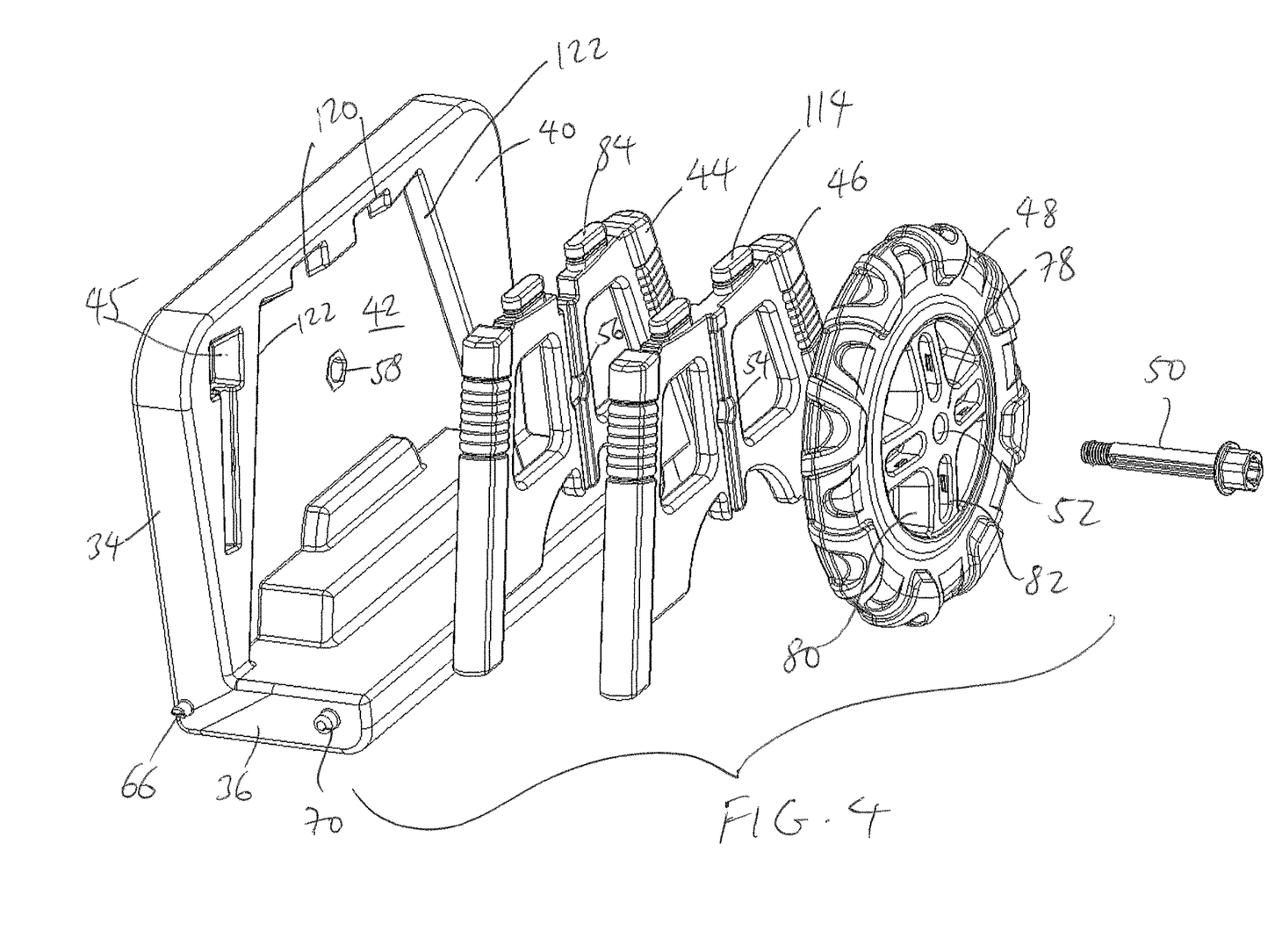
FIG. 4 is an exploded view of the rear panel and spare tire of FIG. 1.

Referring to FIGS. 1, 3 and 4, a rear panel 32 can be seated against the rear of the passenger seats 26 when the vehicle 20 is in the driving mode, and the rear panel 32 can also be positioned for use as a table top when the vehicle 20 is in the stationary mode. The rear panel 32 is generally L-shaped with a larger table top section 34 and a smaller base support 36. The table top section 34 has a table top surface 38 (see FIG. 2) and a bottom surface 40. The bottom surface 40 has a recessed area 42 that is sized and shaped to accommodate a pair of crossing legs 44 and 46 that can be seated inside the recess area 42 and secured against the bottom surface 40. A spare tire 48 can also be secured against the two legs 44 and 46 by a threaded bolt 50 that can be extended through openings 52, 54 and 56 in the spare tire 48, the leg 46 and the leg 44, respectively, and secured to a threaded hole 58 in the rear panel 32. The bottom surface 40 can also have a recessed storage area 45 for receiving and storing the bolt 50.

The base support 36 extends from the table top section 34 by an angle A that can range from zero to 90 degrees, and preferably between 45 and 90 degrees. As shown in FIG. 1, when the vehicle is in the driving mode, the base support 36 sits on top of the trunk floor 64 of the trunk of the vehicle 20, with the table top surface 38 facing and adjacent the passenger seats 26. A first set of two pin members 66 can be provided on opposite sides of the rear panel 32 at the location where the table top section 34 transitions to the base support 36, and a second set of two pin members 70 can be provided on opposite sides of the base support 36. The opposing pin members 70 are inserted into a set of corresponding holes or slots (not shown) provided in the inside wall 68 of the trunk of the vehicle 20 when the vehicle is in the driving mode of FIG. 1. Retaining one or both sets of pin members 66 and 70 inside holes/grooves provided in the inside wall 68 of the trunk of the vehicle 20 allows the rear panel 32 to be secured in place in the trunk area when the vehicle 20 is in the driving mode.

Figure 6:
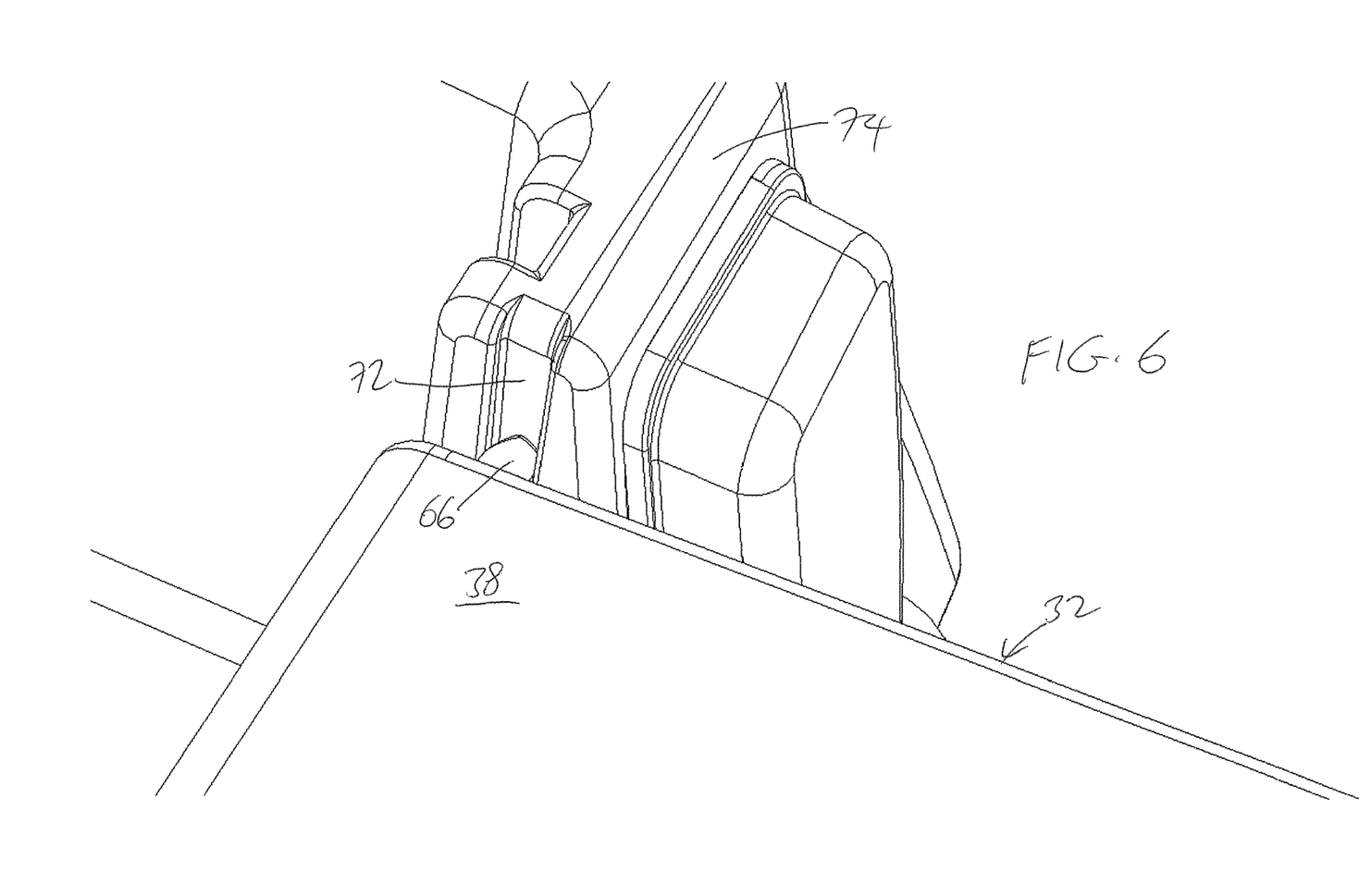
FIG. 6 is an enlarged view of the area marked B in FIG. 2.
Figure 7:
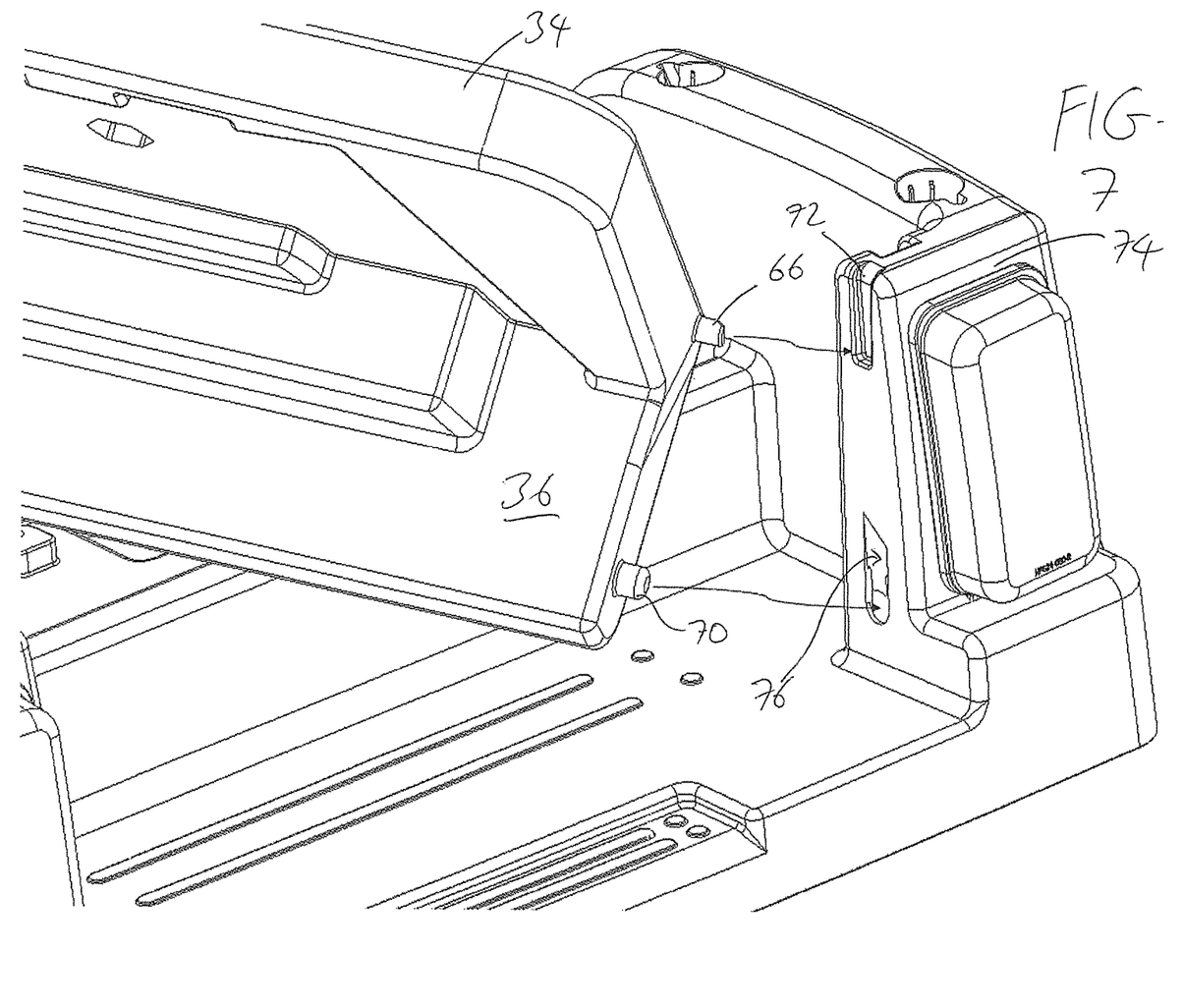
FIG. 7 is an enlarged view showing how the rear panel is secured when used as a picnic table in FIG. 2.

As shown in FIGS. 2, 6 and 7, when the vehicle is in the stationary mode, the rear panel 32 can be removed from its position adjacent the passenger seats 26 and the table top section 34 can be used as a table top. To do so, the rear panel 32 is oriented so that the table top surface 38 is positioned horizontally and faces upwardly (see FIG. 2), the first set of pin members 66 are inserted into corresponding grooves 72 provided on opposite sides of the upper end of the rear wall 74 of the vehicle body 22, and the second set of pin members 70 are inserted into corresponding grooves 76 provided on opposite sides of the lower end of the rear wall 74 of the vehicle body 22. The insertion of these pin members 66 and 70 into corresponding grooves 72 and 76, respectively, allow the rear panel 32 to be secured for use as a table top.

Figure 5:
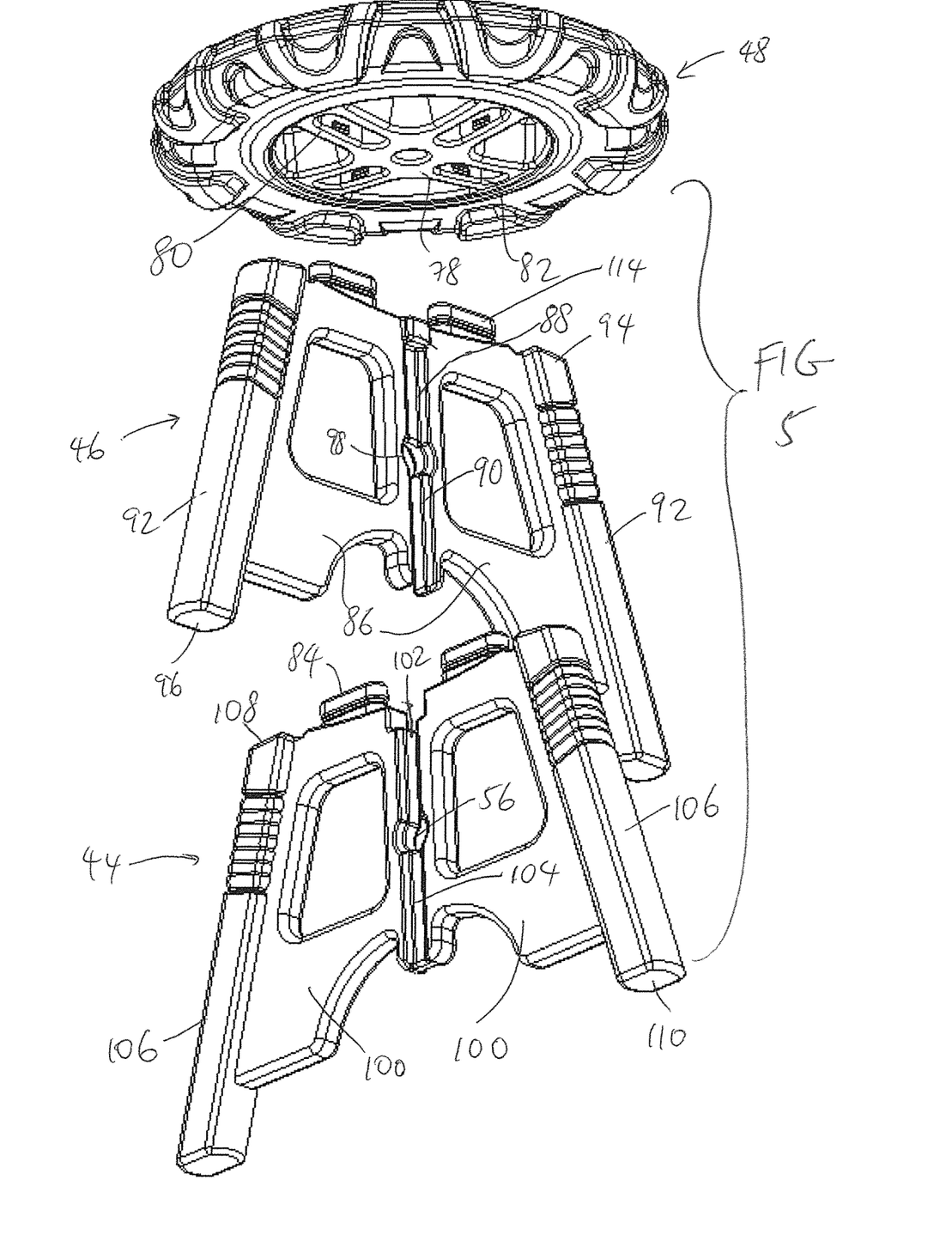
FIG. 5 is an exploded view of the spare tire of FIGS. 1, 3 and 4 being converted into a portable stool.

Separately from the rear panel 32 being used as both a table top in the stationary mode and being folded up against the passenger seats 26 when in the driving mode, the crossing legs 44 and 46, and the spare tire 48, can be conveniently and quickly assembled into a portable stool for the child to use with the table top when the vehicle 20 is in the stationary mode. Referring to FIGS. 4 and 5, the spare tire 48 can be configured to look like a spare tire, and has the opening 52 extending through the center thereof. In addition, the spare tire 48 has a crossing hub 78 with four spokes 80, and with each spoke 80 having a generally rectangular slot 82 extending therethrough. Each slot 82 can have two parallel long sides with two curved end sides.

One crossing leg 46 has two planar pieces 86 that are connected by a connecting strip 88. A slot or space 90 extends between the inner sides of the two pieces 86. Each outer side of the two pieces 86 is provided with a leg section 92. The hole 54 can be defined by providing aligned curved recesses 98 in the inner sides of the pieces 86, with the connecting strip 88 extending upwardly from the hole 54 and the slot 90 extending downwardly from the hole 54. The two leg sections 92 can be flared from each other from the top such that the distance between the upper ends 94 of the leg sections 92 is smaller than the distance between the lower ends 96 of the leg sections 92. One elongated connecting block 114 is provided at the top end of each piece 86.

The other crossing leg 44 has two planar pieces 100 that are connected along their inner sides by a connecting strip 104. A slot or space 102 is provided between the two pieces 86 above the strip 104. Each outer side of the two pieces 100 is provided with a leg section 106. Similarly, the hole 56 can be defined by providing aligned curved recesses in the inner sides of the pieces 100, with the connecting strip 104 extending downwardly from the hole 56 and the slot 102 extending upwardly from the hole 56. The two leg sections 106 can be flared from each other such that the distance between the upper ends 108 of the leg sections 106 is smaller than the distance between the lower ends 110 of the leg sections 106. One elongated connecting block 84 is provided at the top end of each piece 100.

To assemble the portable stool, the crossing leg 46 is placed over the crossing leg 44 while the two legs 46 and 44 are oriented perpendicular to each other, with the strip 104 sliding into the slot 90, and with the strip 88 sliding into the slot 102. This allows the two legs 44 and 46 to be intertwined. Each block 84 and 114 is then fitted inside a corresponding slot 82 in the hub 78 of the spare tire 48, thereby securing the two legs 44 and 46 in a fixed orientation which is stable enough to allow a child to sit on the top of the spare tire 48 which operates as a stool seat. With the rear panel 32 deployed as a table top, the portable stool can be used by the child to have a picnic when the portable stool is placed next to the table top.

When the vehicle 20 is to be driven again, the child can quickly and conveniently separate the legs 44, 46 and the spare tire 48 to disassemble the portable stool. The pin members 66 and 70 are then removed from the grooves 72 and 76, respectively, and the rear panel 32 oriented so that the table top surface 34 is facing and against the passenger seats 26. The child can then place the leg 44 against the recessed area 42. The recessed area 42 is sized and configured so that the leg 44 can be fitted snugly inside the recessed area 42. In this regard, the recessed area 42 has two recessed cut-outs 120 to accommodate the blocks 84, and its two side edges 122 can also be flared with the same dimensions as the leg sections 106. Next, the leg 46 can be placed against the leg 44, and then the spare tire 48 can be placed against the leg 46, as shown in FIG. 4. The threaded bolt 50 can then be can be extended through the openings 52, 54 and 56 in the spare tire 48, the leg 46 and the leg 44, respectively, and secured to a threaded hole 58 in the rear panel 32. The combined rear panel 32, legs 44, 46 and spare tire 48 are now saddled and secured together in the manner shown in FIGS. 1 and 3.

All the components of the vehicle 20, including the rear panel 32, the crossing legs 44, 46 and the spare tire 48, can be made of a plastic material.

Thus, the present invention provides a ride-on toy vehicle with a built-in picnic table and portable stool to enhance the play or entertainment value of the ride-on toy vehicle. The picnic table can be quickly and conveniently deployed as a table top and then later stored against the passenger seats of the vehicle. The vehicle has a built-in spare tire that can be used as a portable stool for the picnic table. The portable stool can be quickly and conveniently assembled and disassembled for storage with the table top.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A ride-on vehicle, comprising:
a vehicle body, a plurality of wheels, at least one passenger seat, a steering wheel, an accelerator pedal, a rear panel, first and second crossing legs and a spare tire;
wherein the rear panel comprises a table top section and a base support, the table top section having a table top surface and a bottom surface;
wherein the rear panel can be positioned in a driving mode position and a stationary mode position, wherein the table top surface is positioned against the passenger seat when in the driving mode position, and the table top surface is positioned horizontally when in the stationary mode position;
wherein the crossing legs and the spare tire can be secured against the bottom of the rear panel when the rear panel is in the driving mode position, and the crossing legs and spare tire can be assembled into a portable stool when removed from the rear panel, with the crossing legs intertwined and the spare tire removably secured on top of the crossing legs.

2. The vehicle of claim 1, wherein the bottom of the rear panel has a recessed area that receives the first crossing leg.

3. The vehicle of claim 1, wherein the rear panel has at least one set of two pins on opposite sides of the rear panel, with the at least one set of two pins removably secured to opposing grooves that are provided in the vehicle body.

4. The vehicle of claim 1, wherein each crossing leg has at least one connecting block, and wherein the spare tire has at least two openings, and when the spare tire and crossing leg are assembled into a portable stool, the each of the at least one connecting block is fitted into a separate one of the at least two openings to secure the spare tire as a seat on top the crossing legs.

5. The vehicle of claim 1, wherein the first crossing leg has a slot that extends through a portion of the first crossing leg, and wherein the second crossing leg has a connecting strip that is fitted in the slot of the first crossing leg when the crossing legs are intertwined together.

6. A method of using a ride-on vehicle, comprising:
providing a ride-on vehicle comprising a vehicle body, a plurality of wheels, at least one passenger seat, a steering wheel, an accelerator pedal, a rear panel, first and second crossing legs and a spare tire, wherein the rear panel comprises a table top section and a base support, the table top section having a table top surface and a bottom surface;
positioning the rear panel in a driving mode position where the table top surface is positioned against the passenger seat when in the driving mode position, with the two crossing legs and the spare tire secured against the bottom surface of the table top section; and
positioning the rear panel in a stationary mode where the table top surface is positioned horizontally, with the crossing legs and spare tire assembled into a portable stool when removed from the rear panel, with the crossing legs intertwined and the spare tire removably secured on top of the crossing legs.

* * * * *